United States Patent
Gill

(10) Patent No.: US 11,440,273 B2
(45) Date of Patent: Sep. 13, 2022

(54) METHOD FOR FORMING A COMPOSITE ARTICLE

(71) Applicant: ROLLS-ROYCE plc, London (GB)

(72) Inventor: Vincent Gill, Bristol (GB)

(73) Assignee: Rolls-Royce plc

(*) Notice: Subject to any disclaimer, the term of this patent is extended or adjusted under 35 U.S.C. 154(b) by 680 days.

(21) Appl. No.: 16/367,350

(22) Filed: Mar. 28, 2019

(65) Prior Publication Data

US 2019/0315075 A1 Oct. 17, 2019

(30) Foreign Application Priority Data

Apr. 11, 2018 (GB) ....................................... 1805954

(51) Int. Cl.
   *B29C 70/34* (2006.01)
   *B29C 70/44* (2006.01)
   *B29C 70/54* (2006.01)
   *F01D 5/28* (2006.01)
   *B29L 31/08* (2006.01)

(52) U.S. Cl.
   CPC ............ *B29C 70/34* (2013.01); *B29C 70/443* (2013.01); *B29C 70/545* (2013.01); *F01D 5/282* (2013.01); *B29C 2793/0081* (2013.01); *B29L 2031/08* (2013.01); *F05D 2300/603* (2013.01)

(58) Field of Classification Search
   CPC .............................. B29C 70/386; B29C 70/48
   See application file for complete search history.

(56) References Cited

U.S. PATENT DOCUMENTS

| 5,217,766 A | 6/1993 | Flonc et al. |
| 2008/0206059 A1* | 8/2008 | Hancock .................. B29C 70/84 |
| | | 416/213 R |
| 2017/0326808 A1 | 11/2017 | Kizhakkepat |

FOREIGN PATENT DOCUMENTS

| EP | 2599604 | 6/2013 |
| EP | 3332948 | 6/2018 |
| GB | 2421005 | 6/2006 |
| GB | 2490469 | 10/2012 |

OTHER PUBLICATIONS

Grimsley, B.W., P. Hubert, X. Song, R.J. Cano, A.C. Loos, R.B. Pipes, Flow and compaction during the vacuum assisted resin transfer molding process, published by ntrs.nasa.gov (2001), 14 pages. (Year: 2001).*

(Continued)

*Primary Examiner* — Matthew J Daniels
(74) *Attorney, Agent, or Firm* — Barnes & Thornburg LLP

(57) ABSTRACT

A method of forming a composite article involves the steps of:
  providing a formed article, the formed article comprising a plurality of non-crimp fibre fabrics with each non-crimp fibre fabric comprising at least two dry-fibre layers;
stabilising the plurality of non-crimp fibre fabrics;
machining a surface of the formed article having exposed ply terminations to provide a smooth blended surface with chamfered plydrops;
positioning the machined formed article in a second mould;
infiltrating the second mould with a polymer matrix resin; and
curing the machined formed article to form the composite article.

14 Claims, 6 Drawing Sheets

(56) References Cited

OTHER PUBLICATIONS

Wisnom, M.R. and B. Khan, Delamination suppression at ply drops by ply chamfering, Delamination suppression at ply drops by ply chamfering, Delamination Behaviour of Composites (2008), pp. 706-720. (Year: 2008).*
Dumont, F, and C. Weimer, Non-Crimp Fabric Composites, Manufacturing, Properties, and Applications (2011), pp. 449-460. (Year: 2011).*
Great Britain search report dated Oct. 11, 2018, issued in GB Patent Application No. 1805954.3.
Extended European Search Report dated Aug. 30, 2019 and issued in connection with European Patent Appln No. 19162100.2.

* cited by examiner

METHOD FOR FORMING A COMPOSITE ARTICLE

CROSS-REFERENCE TO RELATED APPLICATIONS

This application is based upon and claims the benefit of priority from British Patent Application No. GB 1805954.3, filed on 11 Apr. 2018, the entire contents of which are incorporated by reference.

BACKGROUND

Technical Field

The present disclosure relates to a method of forming a composite article and particularly, but not exclusively, to a method of forming a composite fan blade for a turbofan gas turbine engine.

Description of the Related Art

It is well-known to manufacture fibre-reinforced composite components using pre-impregnated precursor fibre or sheet materials, commonly known as 'prepregs'. These prepreg composite precursor materials may be deposited onto a former either manually (hand lay-up) using automated equipment (automated fibre placement).

Prepreg materials since they contain uncured resin material require careful storage (at low temperatures), careful handling (for example, safety concerns with the resin material, and preventing damage to the resin), and closely controlled placement (since repositioning is difficult).

There are advantages to using dry fibre based precursor materials to form the shape of the composite article, to which the resin material is then added prior to the curing process. These advantages include lower material costs, lower storage costs, enhanced formability of the dry precursor, faster material deposition, streamlined curing, and improved geometric conformance.

A known problem with existing composite laminates is the plydrop between precursor layers. A plydrop (sometimes termed ply drop) is the step formed at the edge of a fibre layer when deposited over another fibre layer. The deposition of multi-axial dry fibre fabrics enhances the problem by increasing the size of the plydrop. This results in large resin-rich areas in the final article, which in turn act as damaging local stress concentrations.

SUMMARY

According to a first aspect of the present disclosure there is provided a method of forming a composite article, the method comprising the steps of:

providing a formed article, the formed article comprising a plurality of non-crimp fibre fabrics with each non-crimp fibre fabric comprising at least two dry-fibre layers; stabilising the plurality of non-crimp fibre fabrics;

machining a surface of the formed article having exposed ply terminations to provide a smooth blended surface with chamfered plydrops;

positioning the machined formed article in a second mould;

infiltrating the second mould with a polymer matrix resin; and curing the machined formed article to form the composite article.

The use of non-crimp fibre fabrics provide the composite article with improved in-plane properties because of the highly aligned fibres in the fabric layers.

Torsional properties of the composite article may also be improved because of the inclusion of off-axis fibres, which cannot presently be incorporated into fully woven fabric precursors.

Furthermore, a high degree of tailorability may be provided through the use of distinct layers of potentially different non-crimp fibre fabrics.

Machining the dry fibre preform article prior to infusing it with a polymer matrix resin results in the machined preform article having a smooth blended surface. This eliminates binary plydrops in the interior of the composite article, and replaces them with chamfered plydrops on the surface of the article.

The method of the present disclosure requires that the arrangement of layers of fibre fabric (sometimes termed the 'plybook') is such that the plydrops occur on the surface of the component. This can be achieved by, for example, locating the shorter fibre plies on the exterior of the component.

Chamfered surface plydrops are significantly less detrimental to the mechanical properties of the composite article than are conventional surface binary plydrops.

Machining the preform article provides accurate surface and leading edge and trailing edge geometry. This in turn enables the use of a near net shape moulding process that requires no further machining after infusion of the resin. It also provides a consistent and smooth surface for the attachment of secondary leading edge and/or trailing edge metallic sheaths.

Machining, chamfering and otherwise angled cutting of dry fibre composites is not commonly advisable because of the flexible nature of the fibre composite layers. Carbon fibre strands are only loosely held in place by through thickness stitches and are not readily cut into a repeatable geometry. Off cut, damaged and misaligned fibres, and other inconsistencies, are common. By sufficiently stabilising the preform, a temporary rigid structure is provided that enables repeatable cutting using standard machining processes.

Optionally, the step of providing a formed article, comprises the steps of:

providing a layup surface;

sequentially positioning a plurality of non-crimp fibre fabrics onto the layup surface to form a first sub-section preform, and a second sub-section preform, each non-crimp fibre fabric being oriented in dependence on a geometry and load-carrying capability of the composite article;

assembling the first sub-section preform and the second sub-section preform together to form a preformed article;

positioning the preformed article in a first mould; and press-forming the preformed article in the first mould to create a formed article.

The composite article may be produced in two sub-sections to reduce the complexity of the manufacturing processes. This reduced complexity enables the method of the disclosure to be carried out by simple layup of fabric onto flat tooling.

Dividing the composite article into two sub-sections makes each sub-section easier to manufacture because the plane joining the two sub-sections can be planar. In other words, even for a composite article having a heavily contoured surface, the division into two sub-sections means that only a single contoured surface must be formed on each of the sub-sections.

The step of press-forming the preformed article serves to consolidate the stacked fabric layers of the preformed article by their being compressed together. This in turn helps to maintain the structural integrity of the sub-section preforms in readiness for subsequent handling and processing operations.

The step of press-forming may also change the geometric form of the preformed article to create the formed article. The preformed article may be formed with a planar geometry while the formed article may have a curved and/or convoluted geometry. For example, the preformed article may be formed with a planar geometry, and the press-forming operation transforms the planar preformed article into a formed article in the shape of an aerofoil fan blade, having camber and twist.

Optionally, the step of press-forming the preformed article in the first mould to consolidate the non-crimp fibre fabrics comprises the additional previous step of:

lubricating the stack of non-crimp fibre fabrics with water.

The use of water in the preforming process may provide a lubricating effect that improves the formability of the dry fibre material during its transformation from a performed article to a formed article. This in turn may reduce manufacturing defects in the formed article, such as fibre wrinkling.

Optionally, the step of sequentially positioning a plurality of non-crimp fibre fabrics onto the layup surface to form a sub-section preform, comprises the additional subsequent step of:

applying a vacuum to the sub-section preform to debulk the plurality of non-crimp fibre fabrics.

The application of a vacuum to the sub-section preform may assist in debulking the material, and thereby compress and stabilise the relative positions of the fabric layers. This will in turn assist in maintaining the integrity of the sub-section preforms during subsequent handling and manufacturing operations.

Optionally, the step of assembling the first sub-section preform and the second sub-section preform together to form a preformed article comprises the additional subsequent step of:

providing through-thickness reinforcement to the preformed article;

The use of through-thickness reinforcement will stabilise the sub-section preforms during subsequent manufacturing steps. This stabilisation may, for example, restrict the relative movement between the fibre fabric layers.

The through-thickness reinforcement will also provide improved mechanical strength to the finished cured composite article.

Optionally, the through-thickness reinforcement is provided by a technique selected from the group consisting of any of stitching, tufting, or pinning.

Any of stitching, tufting or pinning will provide through-thickness reinforcement to the stack of fibre fabric layers.

Optionally, the step of infiltrating the machined preform article with a polymer matrix resin, comprises the additional previous step of:

applying a fibre fabric wrap layer to the machined formed article, the fibre fabric wrap layer extending over at least a part of the exterior surface of the machined formed article.

The application of a wrap layer provides surface fibres that are aligned with the geometric shape. This reduces stress discontinuities at the surface of the machined preform article and thus improves the mechanical properties of the machined preform article.

The application of a wrap layer also displaces ply drops internally. This in turn further reduces the stress concentration effect of ply drops on the mechanical properties of the machined preform article.

The wrap layer may be composed of a further non-crimp fabric, a woven fabric, or a braided fabric.

Ply deposition may start on the exterior surface resulting in shorter plies with the associated plydrops near the interior, mid-plane of the composite article. Consequently, in an alternative to the use of a wrap layer, deposition may be on the exterior surface with shorter layers of non-crimp fibre fabric placed near the mid-plane (i.e. near the layup surface) of the composite article. The secondary machining operation would then be on the mid-plane, and not on the exterior surface of the composite article. This would however require a degree of forming during initial preforming but would remove the need for a surface wrap to displace the plydrops. To alleviate concerns regarding premature mid-plane delamination as a result of the accumulation of these plydrops, additional inter-laminar reinforcement may be used, using for example a thermoplastic interleave, carbon nano tube forests, or nano-particles such as graphite nanoplatelets.

Optionally, the step of stabilising the plurality of non-crimp fibre fabrics, comprises the steps of:

infiltrating the first mould with water;
cooling the first mould to freeze the water;
removing the formed article from the first mould;
and the step of machining the formed article having exposed ply terminations to provide a smooth blended surface with chamfered plydrops, comprises the additional subsequent step of:

heating the machined formed article to melt the residual ice;

The use of a second mould to contain the machined preform article allows heat to be applied to the article by heating the second mould. This allows the heat to be readily applied uniformly across the volume of the article so more efficiently heating the article to melt the residual water.

The uniform application of heat energy to the machined preform article is more readily controlled in order to avoid unwanted concentrations of heat Optionally, the step of stabilising the plurality of non-crimp fibre fabrics, comprises the steps of:

applying a thermally activated binder to the plurality of non-crimp fibre fabrics; and
the step of sequentially positioning a plurality of non-crimp fibre fabrics onto the layup surface to form a first sub-section preform, and a second sub-section preform, comprises the additional subsequent step of:

heating the sub-section preform to thermally activate the thermally activated binder.

The use of a thermally activated powder coating or thermally activated binder interleaves may further assist in stabilising the sub-section preforms in readiness for subsequent handling and manufacturing operations.

Optionally, the thermally activated binder is a thermally activated powder coating applied to the plurality of non-crimp fibre fabrics.

Applying the thermally activated powder coating to the plurality of non-crimp fibre fabrics can be done prior to the fabrics being deposited on the layup surface. They may be applied by, for example, spraying or painting or dipping, which is simple and cost effective for a user.

Optionally, the thermally activated binder is a thermally activated film interleaved between adjacent ones of the plurality of non-crimp fibre fabrics.

The thermally activated film can readily be deposited during the initial layup of the sub-section preform making it simple and quick to incorporate into the article. In one arrangement, the film is a thermoplastic film (sometimes termed a 'veil').

The thermoplastic film or veil may provide a strengthening effect to the sub-section preform. This strengthening effect is commonly referred to as interlayer toughening.

Optionally, the layup surface is a flat surface.

By conducting the layup process on a flat surface the process complexity is significantly reduced. This in turn allows for the use of low-cost machinery, with limited degrees of freedom, and higher deposition rates.

In this arrangement, the resulting plydrops are on the exterior surface of the composite article, which is subsequently machined to produce a smooth, blended surface.

Optionally, the layup surface corresponds to an external surface of the formed composite article.

In this alternative arrangement, the plydrops are located on the surface corresponding to mid-plane of the composite article. This reduces the adverse effect of the ply drops on the mechanical properties of the finished composite article.

Optionally, the non-crimp fabric layers are multi-axial non-crimp fabric layers.

The use of multi-axial fabric layers makes the step of producing the sub-section preforms quicker and easier than conventional layup techniques using single fabric layers. Their use increases the rate of material deposition.

Optionally, the step of sequentially positioning a plurality of non-crimp fibre fabrics onto the layup surface to form a sub-section preform, is performed by an automated fabric placement system.

The use of an automated fabric placement system makes the step of forming the sub-section preform quicker than conventional hand lay-up techniques. The automated fabric placement system also allows the fabric layers to be positioned more precisely and repeatably than prior art hand lay-up techniques.

According to a second aspect of the present disclosure there is provided a turbofan engine fan blade formed by the method of the first aspect.

The method of the disclosure provides a cost-efficient and quicker method of forming a composite fan blade for a turbofan gas turbine engine than conventional techniques. Although the method of the disclosure requires separate preform fabrication and water freezing process steps, post-moulding machining is eliminated due to the near net shape moulding of the present disclosure. Furthermore, if multi-axial fabrics are used then the laminate deposition process is more time-effective still.

Optionally, the turbofan engine fan blade comprises a first blade half and a second blade half, the first and second blades halves cooperating to form the fan blade, with a joining plane between the first and second blade halves being a mid-plane of the fan blade, and wherein each of the first and second blade halves is formed by the method of the first aspect.

According to a third aspect of the present disclosure there is provided a computer program that, when read by a computer, causes performance of the method of the first aspect.

The method of the present disclosure is amenable to control by computer, particularly with regard to the step of sequentially positioning a plurality of non-crimp fibre fabrics onto the layup surface. The use of computer control makes the method of the disclosure quicker, more precise, and more repeatable than the conventional equivalent manual process steps.

According to a fourth aspect of the present disclosure there is provided a non-transitory computer readable storage medium comprising computer readable instructions that, when read by a computer, causes performance of the method of the first aspect.

According to a fifth aspect of the present disclosure there is provided a signal comprising computer readable instructions that, when read by a computer, causes performance of the method of the first aspect.

Other aspects of the disclosure provide devices, methods and systems which include and/or implement some or all of the actions described herein. The illustrative aspects of the disclosure are designed to solve one or more of the problems herein described and/or one or more other problems not discussed.

DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
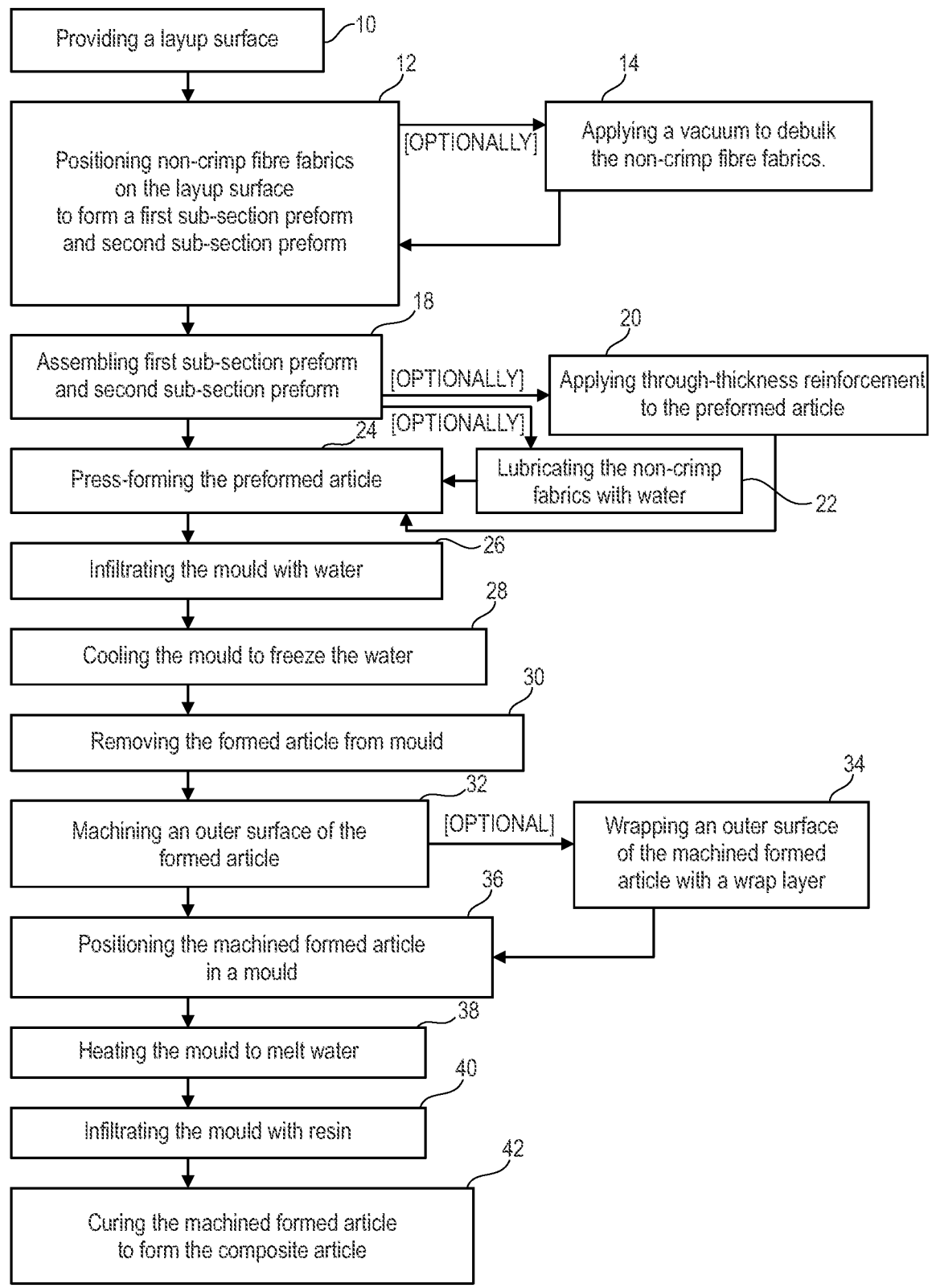
FIG. 1 shows a flow chart illustrating a method according to a first aspect of the present disclosure.

FIG. 1 shows a flowchart for a method of forming a composite article according to a first embodiment of the disclosure. FIGS. 3 to 7 illustrate schematically the process steps of the method of the flowchart of FIG. 1.

Figure 3:
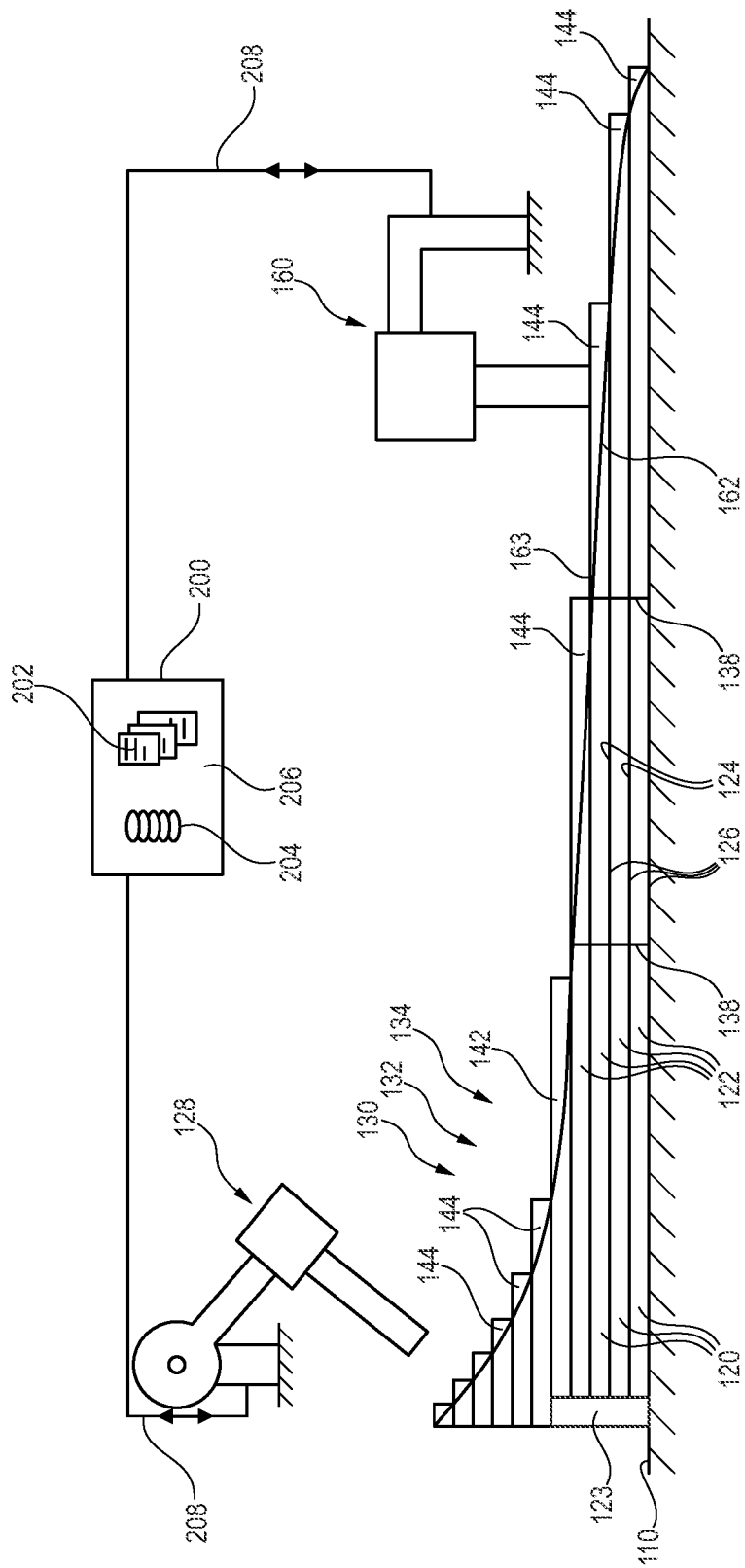
FIG. 3 shows a schematic elevational view of a first embodiment of a sub-section preform produced by either of the methods of FIGS. 1 and 2.

The method starts at step 10 with providing a layup surface 110. In the present embodiment, the layup surface 110 is a flat surface. In other embodiments, the layup surface 110 may be a curved surface. In this embodiment, the layup surface 110 is a geometric mid-plane 102 of the composite article 100, as illustrated in FIG. 3.

At step 12 a plurality of non-crimp fibre fabrics 120 are sequentially positioned onto the layup surface 110 to thereby form a sub-section preform 130. Each of the non-crimp fibre fabrics 120 comprises at least two dry-fibre layers 122. Each of the non-crimp fibre fabrics 120 is oriented in dependence on a geometry and load-carrying capability of the composite article 100. In other words, the direction of the fibres within the various non-crimp fibre fabric 120 is chosen to best meet the loads and stresses that the composite article 100 will experience when in service.

The sequential positioning of the non-crimp fibre fabrics 120 is repeated at step 12 so as to form a first sub-section preform 132 and a second sub-section preform 134.

The method of the disclosure may include the use of tailored non-crimp fabrics to improve material characteristics such as drape and formability. This would allow the relatively thick and rigid fabric layers to better conform to the required geometry in the press forming operation. The fabrics may also be tailored in such a way that they are exhibit variable thickness, specific orientation sequences, optimal widths or pre-applied geometric features (twist and/or camber).

In the present embodiment, an insert 123 is incorporated into one end of the sequential stack of non-crimp fibre fabrics 120. The insert 123 may be formed from a metallic material such as, for example, titanium alloy. The purpose of the insert 123 is to enable the finished composite article to be secured or mounted in another assembly or apparatus. The inclusion of an insert 123 may greatly accelerate the deposition of root material. Fabric layers 120 may also be folded around the insert 123.

At step 14 (shown in FIG. 5), the sub-section preform 130 is enclosed in a vacuum bag and subjected to a vacuum de-bulking process 136. The vacuum debulking serves to consolidate the assembled non-crimp fibre fabrics 120. This makes the subsequent processing operations better able to be carried out without dislodging the fabric layers 120.

The first sub-section preform 132 and the second sub-section preform 134 are then assembled at step 18 to form a preformed article 140.

This assembly step may involve positioning the first sub-section preform 132 against the second sub-section preform 134 with the preform surfaces adjoining the layup surface being joined to one another.

At step 20 through-thickness reinforcement 138 is applied to the preformed article 140. The through-thickness reinforcement 138 may be any one, or combination, of stitching, tufting or pinning.

The preformed article 140 is then infused with water at step 22. The water acts as a lubricant to improve the formability of the dry fibre material in the subsequent press-forming operation.

Figure 6:
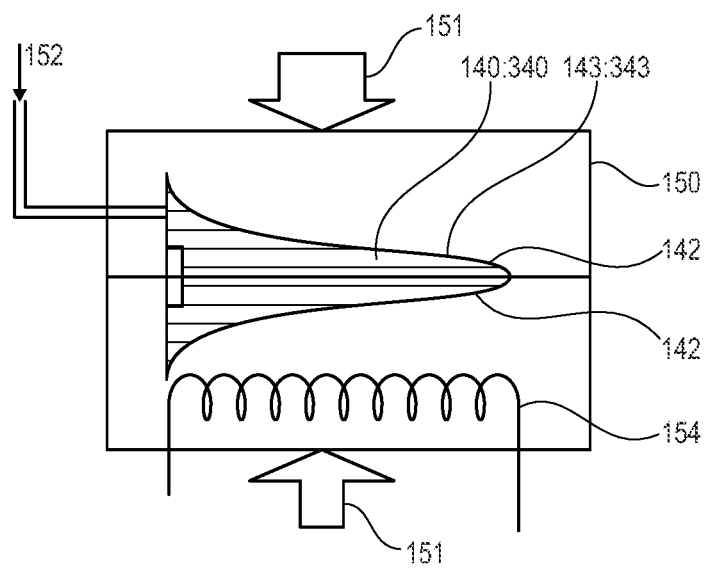
FIG. 6 shows a schematic elevational view of a water infiltration operation from the method of FIG. 1.

The preformed article 140 is then positioned in a first mould 150, at step 24 (shown in FIG. 6). Once in the first mould 150, the preformed article 140 is press-formed 151 to thereby further consolidate the stack of non-crimp fibre fabrics 120, and to introduce geometric features to the resulting formed article 143.

The first mould 150 is then infiltrated with water at step 26 by an infiltration means 152. Sufficient water is added to the first mould 150 to completely fill any interstitial volumes between the formed article 143 and the mould cavity At step 28 the first mould 150 is then cooled by a cooling means 154. In the embodiment shown in the figures, the cooling means 154 takes the form of refrigerant coils embedded within the body of the first mould 150. In an alternative arrangement, the cooling means 154 may be entirely external to the first mould 150 such as, for example, a refrigeration unit sized to accommodate the entire first mould 150.

At step 30 the ice encased formed article 143 is removed from the first mould 150. The ice encased formed article 143 is positioned in readiness to be machined using a machining means 160. The machining means 160 may be any suitable machining apparatus such as, for example, a laser cutter, a machining centre or a computer numerically controlled milling machine.

At step 32 the outer surface 142 of the formed article 143 is machined to correspond to the finished geometry of the composite article 100.

At step 34 an outer surface 163 of the machined formed article 162 may be enclosed with a wrap layer 164. In the embodiment shown on the right hand side of FIG. 2, the wrap layer 164 extends across the entire outer surface 163 of the machined formed article 162.

The composite article 100 may have a metallic sheath or other attachment (not shown) fastened to the outer surface 163 prior to the curing step 42

At step 36 the machined preform article 162 is positioned in a second mould 170. The second mould 170 conformally encloses the machined preform article 162. The second mould 170 is heated at step 38 to melt the residual water, after the machining operations have been completed.

Figure 7:
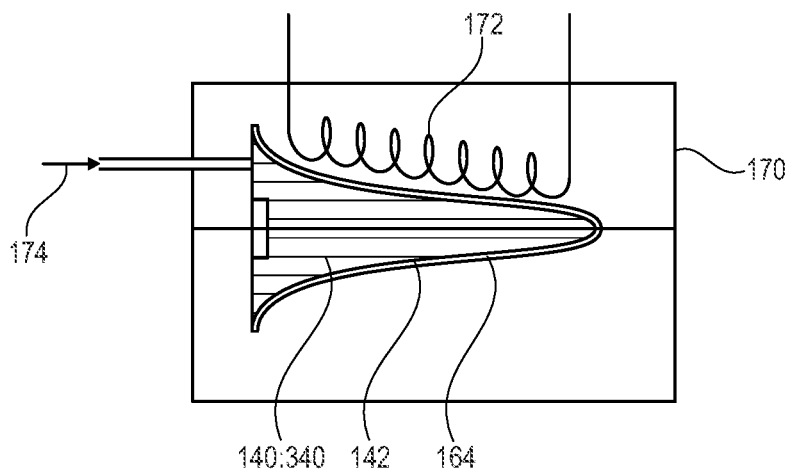
FIG. 7 shows a schematic elevational view of a resin infiltration and curing operations from either of the methods of FIGS. 1 and 2.
Figure 8:
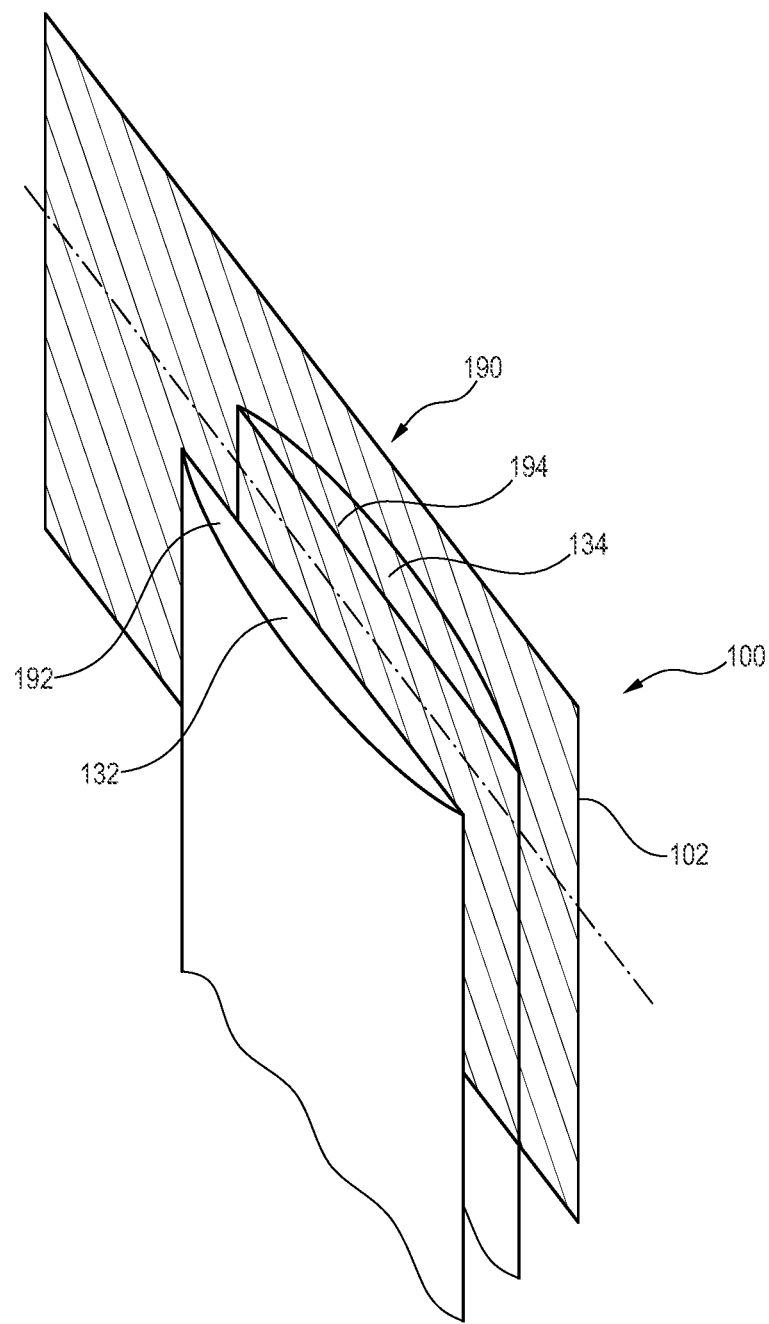
FIG. 8 shows a perspective part-sectional view of a turbofan engine fan blade produced by either of the methods of FIGS. 1 and 2.

The second mould 170 is then infiltrated with a suitable resin material at step 40 (shown in FIG. 7). Examples of a suitable resin material include epoxy, polyethylene, polypropylene, polystyrene, acrylic, polyurethane, unsaturated polyesters, phenolics, and silicones.

Prior to resin infiltration, a vacuum may be applied to the second mould 170 to remove any residual volatiles, and to encourage the uptake of the resin material. In a further alternative, the resin material is injected into the second mould 170.

The machined formed article 162 is then cured at step 42 to form the composite article 100.

Figure 2:
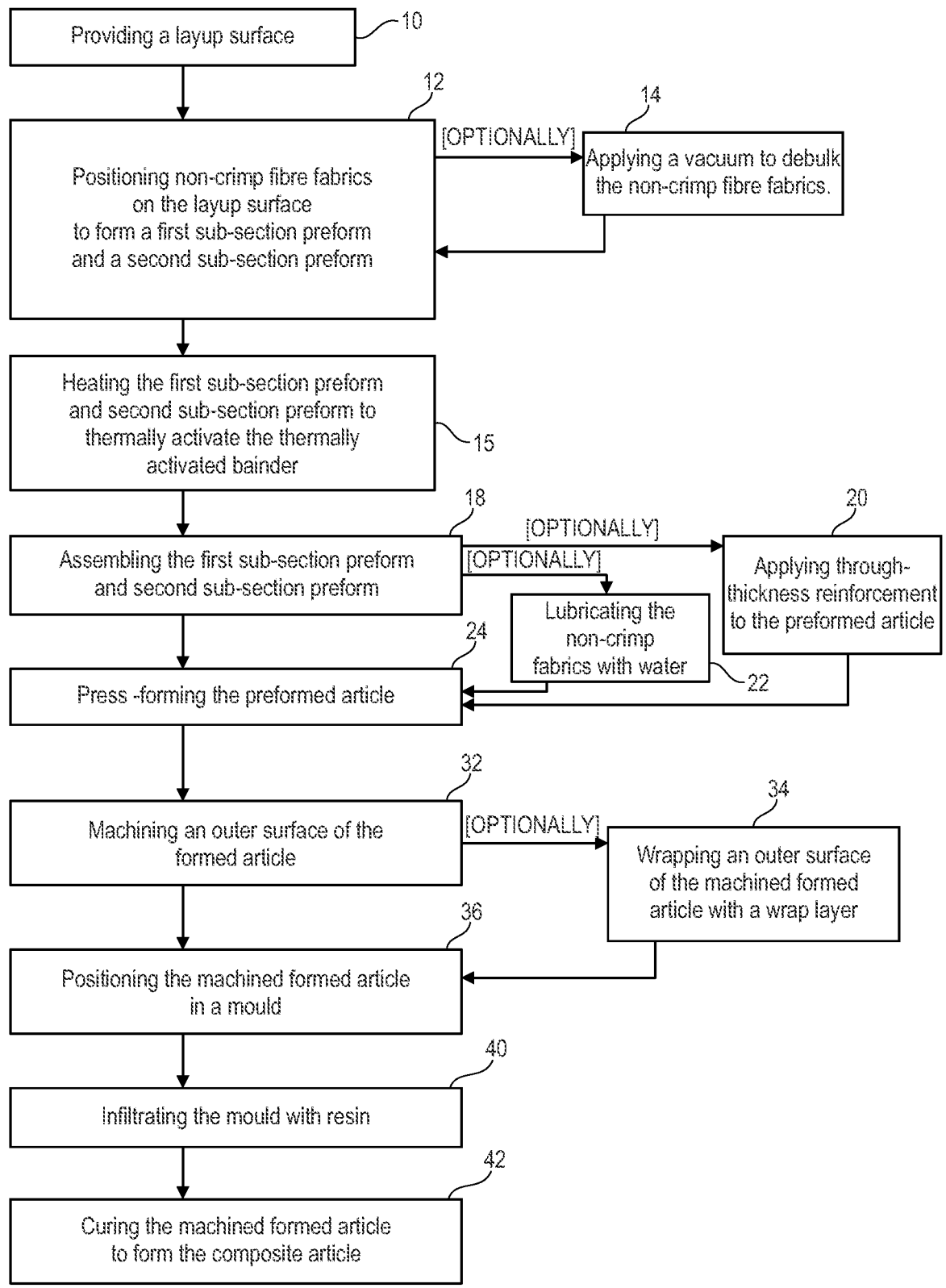
FIG. 2 shows a flow chart illustrating a method according to a second aspect of the present disclosure.

FIG. 2, illustrates a flow chart showing a method according to a second embodiment of the disclosure. Method steps of the flow chart of FIG. 2 which correspond to those of the flow chart of FIG. 1 have been given corresponding reference numerals for ease of reference.

As with the method of FIG. 1, the method of FIG. 2 starts at step 10 with providing a layup surface 110. The layup surface 110 is a geometric mid-plane 102 of the composite article 100, as illustrated in FIG. 3.

The sequential positioning of the plurality of non-crimp fibre fabrics 120 then follows at step 12. As outlined above, this positioning is repeated in order to form a first sub-section preform 132 and a second sub-section preform 134.

Each of the non-crimp fibre fabrics 120 comprises at least two dry-fibre layers 122. In this embodiment, each of the dry-fibre layers 122 is coated with a thermally activated powder 126. This powder coating 124 may be applied by any suitable means such as, for example, by a spray coating process. The thermally activated powder 126 is a material that when heated provides an adhesive connection between adjoining coated dry-fibre layers 122. Examples of suitable thermally activated powders 126 include TEXT.

The thermally activated powder material may be selected from the group consisting of modified epoxies, polyester, polyamide, polyethylene, polypropylene, polyether sulfone and other thermoplastics.

In an alternative embodiment, the adjoining dry-fibre layers 122 may be separated by an interleaved thermoplastic layer, or veil, which is also thermally activated. In other words, the thermoplastic layer melts upon application of thermal energy and provides intra-laminar adhesion through the dry-fibre layers 122.

As mentioned above, each of the non-crimp fibre fabrics 120 is oriented in dependence on a geometry and load-carrying capability of the composite article 100.

The use of tailored non-crimp fabrics may be employed as outlined above in order to improve material characteristics such as drape and formability, and so to allow the relatively thick and rigid fabric layers to better conform to the required geometry in the press forming operation.

An insert 123 may be incorporated into the preformed article as outlined above in relation to the method of FIG. 1.

Figure 5:
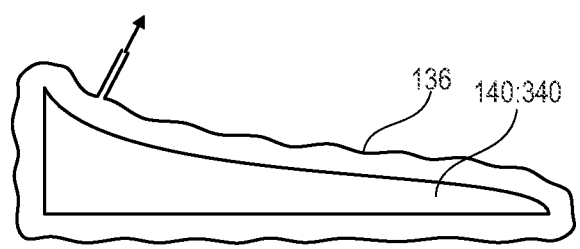
FIG. 5 shows a schematic elevational view of a vacuum debulking operation from either of the methods of FIGS. 1 and 2.

The sub-section preform 130 is enclosed in a vacuum bag and subjected to a vacuum de-bulking process 136 at step 14 (shown in FIG. 5). The sub-section preform 130 is then heated, at step 15, to thermally activate the powder coating 124. Both the vacuum debulking and the thermal activation of the powder coating serve to consolidate the assembled non-crimp fibre fabrics 120. This makes the subsequent processing operations better able to be carried out without dislodging the fabric layers 120.

The first sub-section preform 132 and the second sub-section preform 134 are then assembled at step 18 to form a preformed article 140, with through-thickness reinforcement 138 being applied to the preformed article 140 at step 20.

The preformed article 140 is then positioned in a first mould 150, at step 24. Once in the first mould 150, the preformed article 140 is press-formed 151 to thereby further consolidate the stack of non-crimp fibre fabrics 120, and to introduce geometric features to the resulting formed article 143.

The formed article 143 is positioned in readiness to be machined using a machining means 160. The machining means 160 may be any suitable machining apparatus such as, for example, a laser cutter, a machining centre or a computer numerically controlled milling machine.

At step 32 the outer surface 145 of the formed article 143 is machined to correspond to the finished geometry of the composite article 100.

At step 34 an outer surface 163 of the machined formed article 162 may be enclosed with a wrap layer 164. As indicated in FIG. 7, the wrap layer 164 extends across the entire outer surface 163 of the machined formed article 162.

The composite article 100 may have a metallic sheath or other attachment (not shown) fastened to the outer surface 163 prior to the curing step 42

At step 36 the machined formed article 162 is positioned in a second mould 170. The second mould 170 conformally encloses the machined formed article 162.

The second mould 170 is then infiltrated with a suitable resin material at step 40 (shown in FIG. 7). Examples of a suitable resin material include epoxy, polyethylene, polypropylene, polystyrene, acrylic, polyurethane, unsaturated polyesters, phenolics, and silicones.

Prior to resin infiltration, a vacuum may be applied to the second mould 170 to remove any residual volatiles, and to encourage the uptake of the resin material. In a further alternative, the resin material is injected into the second mould 170.

The machined preform article in then cured at step 42 to form the composite article 100.

The main view of FIG. 3 illustrates a single sub-section preform 130 together with some of the features of the assembled preformed article 140, and the machined formed article 162. Specifically, the outer surface 142, the through-thickness reinforcement 138, the machined portions 144, and the machined formed article 162.

In the embodiment of FIG. 3, the ply deposition starts from the mid-plane of the composite article 100 and finishes at what will be the exterior surface of the composite article 100. This results in the plydrops being located at the exterior surface.

Figure 4:
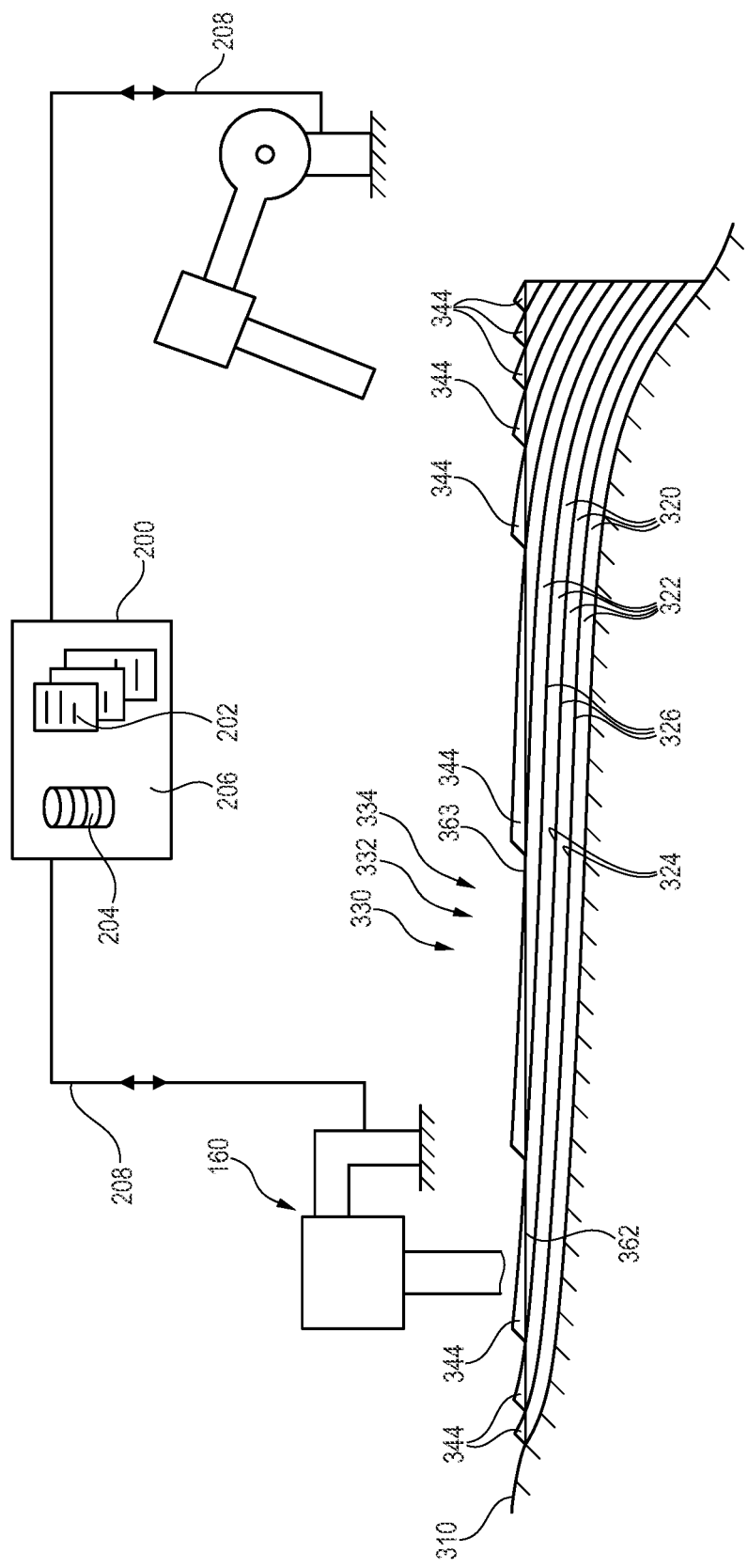
FIG. 4 shows a schematic elevational view of a second embodiment of a sub-section preform produced by either of the methods of FIGS. 1 and 2.

In an alternative arrangement, shown in FIG. 4, the ply deposition starts from the exterior surface of the composite article 100 and finishes at what will be the mid-plane of the composite article 100. This alternative arrangement results in the plydrops being located at the mid-plane of the composite article 100.

In the arrangement of FIG. 4 the layup surface 310 corresponds to the exterior surface of the composite article 100.

At step 12 a plurality of non-crimp fibre fabrics 320 are sequentially positioned onto the layup surface 310 to thereby form a sub-section preform 330. Each of the non-crimp fibre fabrics 320 comprises at least two dry-fibre layers 322. Each of the non-crimp fibre fabrics 320 is oriented in dependence on a geometry and load-carrying capability of the composite article 100. In other words, the direction of the fibres within the various non-crimp fibre fabric 320 is chosen to best meet the loads and stresses that the composite article 100 will experience when in service.

The sequential positioning of the non-crimp fibre fabrics 320 is repeated at step 12 so as to form a first sub-section preform 332 and a second sub-section preform 334.

The method of the disclosure may include the use of tailored non-crimp fabrics to improve material characteristics such as drape and formability. This would allow the relatively thick and rigid fabric layers to better conform to the required geometry in the press forming operation. The fabrics may also be tailored in such a way that they are exhibit variable thickness, specific orientation sequences, optimal widths or pre-applied geometric features (twist and/or camber).

At step 14 (shown in FIG. 5), the sub-section preform 330 is enclosed in a vacuum bag and subjected to a vacuum de-bulking process 136 as outlined above.

The first sub-section preform 332 and the second sub-section preform 334 are then assembled at step 18 to form a preformed article 340 as outlined above.

The preformed article 340 is then infused with water at step 22. The water acts as a lubricant to improve the formability of the dry fibre material in the subsequent press-forming operation.

The preformed article 340 is then positioned in a first mould 150, at step 24 (shown in FIG. 6). Once in the first mould 150, the preformed article 340 is press-formed 151 to thereby further consolidate the stack of non-crimp fibre fabrics 320, and to introduce geometric features to the resulting formed article 343.

The first mould 150 is then infiltrated with water at step 26 by an infiltration means 152. Sufficient water is added to the first mould 150 to completely fill any interstitial volumes between the formed article 343 and the mould cavity At step 30 the ice encased formed article 343 is removed from the first mould 150. The ice encased formed article 343 is positioned in readiness to be machined using a machining means 160.

At step 32 the outer surface 342 of the formed article 343 is machined to correspond to the finished geometry of the composite article 100.

At step 34 an outer surface 163 of the machined formed article 362 may be enclosed with a wrap layer 164.

At step 36 the machined preform article 362 is positioned in a second mould 170. The second mould 170 conformally encloses the machined preform article 362. The second mould 170 is heated at step 38 to melt the residual water, after the machining operations have been completed. The second mould 170 is then infiltrated with a suitable resin material at step 40 (shown in FIG. 7).

Prior to resin infiltration, a vacuum may be applied to the second mould 170 to remove any residual volatiles, and to encourage the uptake of the resin material. In a further alternative, the resin material is injected into the second mould 170.

The machined formed article 362 is then cured at step 42 to form the composite article 100.

In one or more examples, the operations described may be controlled in hardware, software, firmware, or any combination thereof. If controlled in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various example embodiments of the invention are described herein. Reference is made to these examples in a non-limiting sense. They are provided to illustrate more broadly applicable aspects of the invention. Various changes may be made to the invention described and equivalents may be substituted without departing from the scope of the invention. In addition, many modifications may be made to adapt a particular situation, material, composition of matter, process, process act(s) or step(s) to the objective(s), spirit or scope of the present invention. Further, it will be appreciated by those with skill in the art that each of the individual variations described and illustrated herein has discrete components and features which may be readily separated from or combined with the features of any of the other several embodiments without departing from the scope of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A method of forming a composite article, the method comprising the steps of:
   providing a formed article, the formed article comprising a plurality of non-crimp fibre fabrics with each non-crimp fibre fabric comprising at least two dry-fibre layers;
   stabilising the plurality of non-crimp fibre fabrics;
   arranging an insert at a first end of the plurality of non-crimp fibre fabrics such that at least a first plurality of non-crimp fibre fabrics are arranged directly adjacent to and contacting the insert;

machining a surface of the formed article having exposed ply terminations to provide a smooth blended surface with chamfered plydrops;

positioning the machined formed article in a second mould;

infiltrating the second mould with a polymer matrix resin; and curing the machined formed article to form the composite article, wherein the step of infiltrating the machined preform article with a polymer matrix resin, comprises the additional previous step of applying a fibre fabric wrap layer to the machined formed article, the fibre fabric wrap layer extending over at least a part of the exterior surface of the machined formed article.

2. The method as claimed in claim 1, wherein the non-crimp fabric layers are multi-axial non-crimp fabric layers.

3. The method as claimed in claim 1, wherein the step of providing a formed article, comprises the steps of:

providing a layup surface;

sequentially positioning a plurality of non-crimp fibre fabrics onto the layup surface to form a first sub-section preform, and a second sub-section preform, each non-crimp fibre fabric being oriented in dependence on a geometry and load-carrying capability of the composite article;

assembling the first sub-section preform and the second sub-section preform together to form a preformed article;

positioning the preformed article in a first mould; and press-forming the preformed article in the first mould to create a formed article.

4. The method as claimed in claim 3, wherein the step of press-forming the preformed article in the first mould to consolidate the non-crimp fibre fabrics comprises the additional previous step of:

lubricating the stack of non-crimp fibre fabrics with water.

5. The method as claimed in claim 3, wherein the step of sequentially positioning a plurality of non-crimp fibre fabrics onto the layup surface to form a sub-section preform, comprises the additional subsequent step of:

applying a vacuum to the sub-section preform to debulk the plurality of non-crimp fibre fabrics.

6. The method as claimed in claim 3, wherein the step of assembling the first sub-section preform and the second sub-section preform together to form a preformed article comprises the additional subsequent step of:

providing through-thickness reinforcement to the preformed article.

7. The method as claimed in claim 6, wherein the through-thickness reinforcement is provided by a technique selected from the group consisting of any of stitching, tufting, or pinning.

8. The method as claimed in claim 3, wherein the step of stabilising the plurality of non-crimp fibre fabrics, comprises the steps of:

infiltrating the first mould with water;

cooling the first mould to freeze the water;

removing the formed article from the first mould; and the step of machining a surface of the formed article having exposed ply terminations to provide a smooth blended surface with chamfered plydrops, comprises the additional subsequent step of: heating the machined formed article to melt the residual ice.

9. The method as claimed in claim 3, wherein the step of stabilising the plurality of non-crimp fibre fabrics, comprises the steps of:

applying a thermally activated binder to the plurality of non-crimp fibre fabrics; and the step of sequentially positioning a plurality of non-crimp fibre fabrics onto the layup surface to form a first sub-section preform, and a second sub-section preform, comprises the additional subsequent step of:

heating the sub-section preform to thermally activate the thermally activated binder.

10. The method as claimed in claim 9, wherein the thermally activated binder is a thermally activated powder coating applied to the plurality of non-crimp fibre fabrics.

11. The method as claimed in claim 9, wherein the thermally activated binder is a thermally activated film interleaved between adjacent ones of the plurality of non-crimp fibre fabrics.

12. The method as claimed in claim 3, wherein the insert extends substantially perpendicularly to a longitudinal extent of each of the plurality of non-crimp fibre fabrics, wherein the plurality of non-crimp fibre fabrics includes at least one non-crimp fibre fabric arranged above the insert, and wherein a top surface of the insert is arranged adjacent to and contacts the at least one non-crimp fibre fabric arranged above the insert.

13. The method as claimed in claim 3, further comprising:

prior to infiltrating the second mould with a polymer matrix resin, applying a vacuum to the second mould to remove any residual volatiles and to encourage the uptake of the polymer matrix resin.

14. The method as claimed in claim 3, wherein the step of sequentially positioning a plurality of non-crimp fibre fabrics onto the layup surface to form a sub-section preform, is performed by an automated fabric placement system.

* * * * *